United States Patent
Oury et al.

(10) Patent No.: US 8,412,501 B2
(45) Date of Patent: Apr. 2, 2013

(54) PRODUCTION SIMULATOR FOR SIMULATING A MATURE HYDROCARBON FIELD

(75) Inventors: Jean-Marc Oury, Paris (FR); Bruno Heintz, Paris (FR); Hugues de Saint Germain, Sainte-Foy-les-Lyon (FR)

(73) Assignee: FOROIL, Paris (FR)

( * ) Notice: Subject to any disclaimer, the term of this patent is extended or adjusted under 35 U.S.C. 154(b) by 355 days.

(21) Appl. No.: 12/816,940

(22) Filed: Jun. 16, 2010

(65) Prior Publication Data

US 2011/0313744 A1 Dec. 22, 2011

(51) Int. Cl.
*G06G 7/48* (2006.01)
(52) U.S. Cl. .................................................. 703/10
(58) Field of Classification Search ............... 703/10
See application file for complete search history.

(56) References Cited

U.S. PATENT DOCUMENTS

| | | | | |
|---|---|---|---|---|
| 6,810,332 B2* | 10/2004 | Harrison | ............... | 702/13 |
| 7,395,252 B2* | 7/2008 | Anderson et al. | ............... | 706/45 |
| 7,774,184 B2* | 8/2010 | Balci et al. | ............... | 703/10 |
| 2002/0100584 A1* | 8/2002 | Couet et al. | ............... | 166/250.15 |
| 2004/0220790 A1* | 11/2004 | Cullick et al. | ............... | 703/10 |
| 2004/0254734 A1* | 12/2004 | Zabalza-Mezghani et al. | ............... | 702/13 |
| 2009/0119018 A1* | 5/2009 | Priezzhev et al. | ............... | 702/11 |
| 2010/0185427 A1* | 7/2010 | Tilke et al. | ............... | 703/10 |
| 2011/0313743 A1* | 12/2011 | Oury et al. | ............... | 703/10 |

FOREIGN PATENT DOCUMENTS

GB  2467032 A  *  7/2010

OTHER PUBLICATIONS

Printout from Assignee's website published Jan. 14, 2010.

* cited by examiner

*Primary Examiner* — Mary C Jacob
*Assistant Examiner* — Aniss Chad
(74) *Attorney, Agent, or Firm* — Cozen O'Connor

(57) ABSTRACT

A production simulator (2), for simulating a mature hydrocarbon field, providing quantity produced ($Q_{\varphi ktb}$) per phase, per well, per layer (or group of layers) and per time as a function of production parameters (PP), wherein the production simulator (2) matches history data (HD) of the mature hydrocarbon field and verifies a Vapnik condition.

24 Claims, 2 Drawing Sheets

PRODUCTION SIMULATOR FOR SIMULATING A MATURE HYDROCARBON FIELD

BACKGROUND OF THE INVENTION

1. Field of the Invention

The technical domain of the invention is the exploitation of hydrocarbon fields. More particularly the invention concerns a method of building a reliable simulator able to forecast quantities produced vs. production parameters, in the particular case of mature fields.

2. Description of the Related Art

Mature hydrocarbon fields represent a special challenge both in terms of investment and allocation of human resources, because the net present value of any new investment diminishes with the degree of maturity. Therefore, less and less time and effort can be invested in reservoir studies to support field exploitation. Still, there remain opportunities to improve the production over a so-called "baseline" or "business as usual" behavior of an entire mature field, even with little investment. Past strategic choices in the way to operate the hydrocarbon field have created some heterogeneity in pressure and saturation. These can be drastically revisited and production parameters reshuffled accordingly. With respect to a mature hydrocarbon field, many production avenues have been explored in the past, and a learning process can be applied: reshuffled parameters can be implemented with low risk.

Two prior art approaches are currently known to model the behavior of a hydrocarbon field and to forecast an expected quantity produced in response to a given set of applied production parameters.

A first approach, called "meshed model" or "finite element modeling" parts a reservoir into more than 100,000s of elements (cells, flowlines . . . ), each cell carrying several parameters (permeability, porosity, initial saturation . . . ), and applies physical laws over each of said cells in order to model the behavior of fluids in the hydrocarbon field. In that case the so-called Vapnik-Chervonenkis, VC-dimension h of the space of solutions S, from which the simulator is selected, is very large. Therefore, the available number m of measured data in history data remains comparatively small, even for mature fields, and the ratio h/m appears to be very large compared to 1. As a result of the Vapnik learning theory, which is further mentioned later, the forecast expected risk R is not properly bounded (due to the Φ term), and such a simulator can not be considered to be reliable, even if it presents a very good match with history data. In practice, it is widely recognized that for such meshed models, a good history match does not guarantee a good forecast: there are billions of ways to match the past, leaving large uncertainty on which one provides a good forecast.

A second approach, by contrast, uses over-simplified models, such as, for instance, decline curves or material balance. However, this is too simplified to properly take into account the relevant physics and geology of the reservoir, in particular complex interaction and phenomena. In such case, the forecast expected risk R is not minimized, because no good match can be reached (the empirical Risk $R_{emp}$ term remains large).

SUMMARY OF THE INVENTION

In summary, an embodiment of the invention represents a proper compromise between too complex and too simplistic modeling approaches. It is valid only for mature fields, which deliver enough past information, in the form of history data HD, to allow building a space S of candidates for becoming a field production simulator, large enough to take into account all key phenomena at stake in the field, without becoming too complex and hence requiring too many history data to be calibrated.

The Vapnik statistical learning theory defines under which conditions such a simulator can be devised. Such a simulator may be designed in such a way it complies with the conditions for a reliable forecasting capacity.

An object of the invention is a production simulator, for simulating a mature hydrocarbon field, providing quantity produced per phase, per well, per layer (or group of layers) and per time as a function of production parameters, wherein said production simulator matches sufficiently well history data of said mature hydrocarbon field and verifies a Vapnik condition. This said Vapnik condition ensures that the quantities calculated to be produced per phase, per well, per layer (or group of layers) and per time to be accurate. This will allow the users of this simulator to play different production scenarios, according to different production parameters, each of them delivering reliable quantities, so that such scenarios can be properly compared to each other and an appropriate one can be selected according to specific criteria. As all production scenarios will deliver reliable quantities, the selected one will also deliver a reliable forecast of the production, and therefore it will become a low risk and preferred path for producing the field.

According to another feature of the invention, a match with history data is obtained when:

$$\frac{\|Q_{\varphi ktb} - Q_{\varphi ktbHD}\|_{[T_1-Xy,T_1]}}{\|Q_{\varphi ktbHD}\|_{[T_1-Xy,T_1]}} \leq \varepsilon_1,$$

for more than p % of existing $Q_{\varphi ktbHD}$ values and the cumulated oil produced over the same $[T_1-Xy, T_1]$ time interval is accurate up to $\varepsilon_2$, where $Q_{\varphi ktb}$ are quantities produced per phase, per well, per layer (or group of layers) and per time, determined by the production simulator, $Q_{\varphi ktbHD}$ are the same quantities produced per phase, per well, per layer (or group of layers) and per time, found in history data, $[T_1-Xy, T_1]$ is the time interval comprising the most recent X years before time $T_1$, $T_1$ being the last date for which history data is available, $\|Z\|_{[T_1,T_2]}$ denotes a norm of Z over time interval $[T_1,T_2]$, $\varepsilon_1$ being a positive number small with respect to 1, and $\varepsilon_2$ being a positive number small with respect to 1, and p being a positive number close to 100%.

Such feature allows to practically defining the situation when a simulator can be considered as delivering a satisfactory history match, which is a necessary condition, to be a candidate for showing satisfactory forecasting capacities.

According to another feature of the invention, X=5, $\varepsilon_1$=0.2, and $\varepsilon_2$=0.15 and p=90%.

Such feature allows framing the conditions under which the history match can be considered as accurate; it gives an order of magnitude of the accuracy, which can be expected for satisfactory forecasted quantities.

According to another feature of the invention, the Vapnik condition is expressed as $$\frac{h}{m} \le 0,1,$$

where:
h is the Vapnik-Chervonenkis dimension of the space S of solutions, from which the simulator is selected, and
m is the number of independent measures available in history data.

Such feature allows framing the conditions, when they can be calculated, for achieving a satisfactory forecasting capacity.

According to another feature of the invention, the Vapnik condition is verified by realizing a satisfactory blind test over N years, as defined by the following steps:
determining a production simulator matching history data over a time interval preceding T−Ny,
forecasting quantities produced over a time interval [T−Ny, T] given production parameters over the same time interval [T−Ny, T],
the blind test being satisfactory when:

$$\frac{\|Q_{\varphi ktb} - Q_{\varphi ktbHD}\|_{[T-Ny,T]}}{\|Q_{\varphi ktbHD}\|_{[T-Ny,T]}} \le \varepsilon_1,$$

for more than p % of existing $Q_{\varphi ktbHD}$ values and the cumulated oil produced over the same [T−Ny, T] time interval is accurate up to $\epsilon_2$, where $Q_{\varphi ktb}$ are quantities produced per phase, per well, per layer (or group of layers) and per time, determined by the production simulator, $Q_{\varphi ktbHD}$ are the same quantities produced per phase, per well, per layer (or group of layers) and per time, found in history data,

[T−Ny, T] is the time interval comprising the most recent N years before time T, T being the last date for which history data is made available, $\|X\|_{[T_1,T_2]}$ denotes a norm of X over time interval [T1,T2], $\epsilon_1$ being a positive number small with respect to 1, and $\epsilon_2$ being a positive number small with respect to 1, and p being a positive number close to 100%.

Such feature allows defining a discriminating test for deciding whether a simulator exhibits a satisfactory forecasting capacity, without looking at the way it has been set up, but rather at the actual results it can achieve. Such feature allows carrying out the test without the need to wait for years and measure the results, but rather to use data already available to the third party conducting the test, and not available to the party setting up the simulator (the latter party is "blind").

According to another feature of the invention, $\epsilon_1$=0.1, and $\epsilon_2$=0.1, p=90% and N=3.

Such feature allows framing practical conditions for the blind test, which can be accepted for properly discriminating a satisfactory simulator from a non-satisfactory simulator.

According to another feature of the invention, the Vapnik condition is a forecast stability property verified when if $$\frac{\|PP - PP'\|_{[T_0,T]}}{\|PP\|_{[T_0,T]}} \le \varepsilon \text{ and } \frac{\|Q_{\varphi ktbHD} - Q'_{\varphi ktbHD}\|_{[T_0,T]}}{\|Q_{\varphi ktbHD}\|_{[T_0,T]}} \le$$

$$\varepsilon \text{ then } \frac{\|Q_{\varphi ktb} - Q'_{\varphi ktb}\|_{[T,T+Ny]}}{\|Q_{\varphi ktb}\|_{[T,T+Ny]}} \le n\varepsilon$$

where
PP are production parameters,
PP' are slightly varying different production parameters,
$Q_{\varphi ktbHD}$ are quantities produced per phase, per well, per layer (or group of layers) and per time, found in history data,
$Q_{\varphi ktbHD}$' are slightly varying different quantities produced per phase, per well, per layer (or group of layers) and per time, found in a slightly varying different history data,
$Q_{\varphi ktb}$ are quantities produced per phase, per well, per layer (or group of layers) and per time, determined by the production simulator,
$Q_{\varphi ktb}$' are quantities produced per phase, per well, per layer (or group of layers) and per time, determined by an other close enough production simulator determined out of slightly varying different history data,
[$T_0$, T] is the time interval from time $T_0$ to time T, being respectively the initial and the last date for which history data is available,
[T, T+Ny] is the time interval comprising the Ny years after time T,
$\|Z\|_{[T_1,T_2]}$ denotes a norm of Z over time interval [$T_1,T_2$],
$\epsilon$ being a positive number small with respect to 1, and
n being a small integer less than 5.

Such feature allows defining whether a simulator exhibits properties, which are a pre-requisite to reliably calculate forecasted quantities. This test does not require comparing with another existing simulator, nor does it require knowing about the way this simulator has been set up, as only its resulting properties are tested.

According to another feature of the invention, $\epsilon$=0.05, n=2 and N=3.

This feature allows practically framing the forecast stability, over a period of three years.

According to another feature of the invention, the production simulator is built following the steps of:
defining initial detailed reservoir partition, rock properties, laws of reservoir physics and laws of well physics,
upscaling said reservoir partition, rock properties, laws of reservoir physics and laws of well physics until said Vapnik condition is verified, and
calibrating said production simulator by choosing among the production simulator candidate solutions, the candidate solution, defined by α and minimizing an expected so called "empirical risk" $R_{emp}(\alpha)$.

Upscaling means reducing complexity. Upscaling is carried out in such a way that the space of solutions candidates for becoming a simulator is such as $$\Phi\left(\frac{h}{m}, \delta\right)$$

is as small as possible, where:
δ is a positive number close to zero, 1−δ defining a probability and Φ is a positive function defined by:

$$\Phi\left(\frac{h}{m}, \delta\right) = 2\sqrt{\frac{2}{m}\left(h\log\left(\frac{2em}{h}\right) + \log\left(\frac{2}{\delta}\right)\right)},$$

where h is the Vapnik-Chervonenkis dimension of the space of solutions, and m is the number of independent measures available in history data, e is equal to exp(1).

Calibrating the production simulator among the candidates of the space of solutions means making the "empirical risk" $R_{emp}(\alpha)$ as small as possible, while choosing the appropriate parameters α that completely defines a solution within the space of solutions. This empirical risk $R_{emp}(\alpha)$ measures a (positive) distance between actual past data and the corresponding data calculated by the simulator.

This upscaling process is a way to reach a trade-off between $$\Phi\left(\frac{h}{m}, \delta\right)$$

and $R_{emp}(\alpha)$ values, which need to be together as small as possible, as the objective is to minimize their sum $$R_{emp}(\alpha) + \Phi\left(\frac{h}{m}, \delta\right)$$

with a given probability 1-δ.

In minimizing the above-mentioned sum, this minimizes the expected risk of the forecast, R(α), according to the Vapnik inequality:

$$R(\alpha) \leq R_{emp}(\alpha) + \Phi\left(\frac{h}{m}, \delta\right)$$

Such feature allows minimizing the expected risk of the forecast R(α), while starting from large values of $$\Phi\left(\frac{h}{m}, \delta\right)$$

(as starting models are complex) and small empirical risks $R_{emp}(\alpha)$ (as such complex models can properly picture past data) and gradually decrease the complexity, and therefore $$\Phi\left(\frac{h}{m}, \delta\right)$$

while keeping a good match of past data, therefore keeping the empirical risk $R_{emp}(\alpha)$ small.

According to another feature of the invention, said reservoir partition is upscaled following the steps of:

partitioning a reservoir G into elementary parts $G_{ab}$, such that $$G = \bigcup_{a=1}^{A}\bigcup_{b=1}^{B} G_{ab}$$

with $G_{ab} \cap G_{a'b'} = \emptyset$ for (a,b)≠(a',b'), where a ∈ {1 . . A} describes a x-y area, and b ∈ {1 . . . B} describes one or several z layers, grouping adjacent elementary parts exhibiting homogeneous rock properties, into sub-geologies $G_c$ where c ∈ {1 . . . C}.

Such feature gives a practical way of upscaling the field geology in identifying a reasonably small number of sub-geologies $G_c$.

According to another feature of the invention, rocks properties are upscaled by following a step of averaging out rock properties over each sub-geology, according to formula:

$$RP_c = \frac{1}{V_c}\int_{G_c}\int\int RP(x, y, z)dx\,dy\,dz,$$

where $V_c$ is the volume of sub-geology $G_c$.

This feature explains a way to practically define the properties to be used in a given sub-geology $G_c$.

According to another feature of the invention, laws of reservoir physics are upscaled in such a way they apply with functioning parameters of the sub-geology and wherein space and times scales associated with the sub-geology are determined in such a way that the associated space of solutions is consistent with the complexity of history data at the well level.

Such feature gives the rules to look for upscaled reservoir physics laws, in focusing on their behavior measured at well level.

According to another feature of the invention, the production simulator is built following the steps of:

defining initial coarse reservoir partition, rock properties, laws of reservoir physics and laws of well physics, downscaling said reservoir partition, rock properties, laws of reservoir physics and laws of well physics while keeping said Vapnik condition verified, until the production simulator matches history data and calibrating said production simulator by choosing among the production simulator candidate solutions, the candidate solution minimizing a forecast expected risk.

Downscaling means increasing complexity, starting from a simplistic description of the field, and adding relevant reservoir and/or well phenomena, which will properly picture the behavior of the entire field, well by well. Downscaling is carried out in such a way that the space of solutions candidates for becoming a simulator remains such as $$\Phi\left(\frac{h}{m}, \delta\right)$$

is as small as possible, where:

δ is a positive number close to zero, 1-δ defining a probability and

Φ is a positive function defined by:

$$\Phi\left(\frac{h}{m}, \delta\right) = 2\sqrt{\frac{2}{m}\left(h\log\left(\frac{2em}{h}\right) + \log\left(\frac{2}{\delta}\right)\right)},$$

where h is the Vapnik-Chervonenkis dimension of the space of solutions, and m is the number of independent measures available in history data, e is equal to exp(1).

Calibrating the production simulator among the candidates of the space of solutions means making the "empirical risk" $R_{emp}(\alpha)$ as small as possible, while choosing the appropriate parameters "α" that completely defines a solution within the space of solutions. This empirical risk measures a distance between actual past data and the corresponding data calculated by the simulator.

This downscaling process is a way to reach a trade-off between $$\Phi\left(\frac{h}{m}, \delta\right)$$

and $R_{emp}(\alpha)$ values, which need to be together as small as possible, as the objective is to minimize their sum $$R_{emp}(\alpha) + \Phi\left(\frac{h}{m}, \delta\right)$$

with a given probability 1-δ.

In minimizing the above-mentioned sum, this minimizes the expected risk of the forecast, R(α), according to the Vapnik inequality:

$$R(\alpha) \leq R_{emp}(\alpha) + \Phi\left(\frac{h}{m}, \delta\right)$$

Such feature allows minimizing the expected risk of the forecast R(α), while starting from small values of $$\Phi\left(\frac{h}{m}, \delta\right)$$

(as starting models are simplistic) and large empirical risks $R_{emp}(\alpha)$ (as such simplistic model do not properly picture past data) and gradually increasing the complexity, and therefore increasing $$\Phi\left(\frac{h}{m}, \delta\right)$$

in order to better match past data, therefore decreasing the empirical risk $R_{emp}(\alpha)$.

According to another feature of the invention, said reservoir partition is downscaled following the steps of:
starting from the whole reservoir,
parting said reservoir into sub-geologies where a substantial change of reservoir properties is present at around the boundary between said sub-geologies.

Such feature describes the process of going from global field description to a refined understanding, where local behaviors are identified at a finer scale $G_c$.

According to another feature of the invention, wherein rocks properties are downscaled by defining new separate rock field properties over each sub-geology.

Such feature describes the principle of allocating different physical properties at the $G_c$ level.

According to another feature of the invention, laws of reservoir physics are downscaled in such a way they apply with functioning parameters of the sub-geology and wherein space and times scales associated with the sub-geology are determined in such a way that the associated space of solutions is consistent with the complexity of history data at the well level.

Such feature gives the rules to look for downscaled reservoir physics laws, in focusing on their behavior measured at well level.

According to another feature of the invention, the laws of reservoir physics are derived from the (Navier-)Stokes equations of conservation of momentum and conservation of mass for a fluid or gas evolving in a rock modeled as a porous medium, only characterized by its averaged porosity and relative/permeability per time per phase per sub-geology.

This feature explains how general laws of reservoir physics can be simplified at the sub-geology level, while averaging out some key parameters over the entire sub-geology $G_c$.

According to another feature of the invention, the laws of reservoir physics comprise formulas:

$$u_{\varphi k} = -\frac{k}{\mu_b} k_{r\varphi}(\nabla P_\varphi - \rho_\varphi g),$$

where:
$u_{\varphi kc}$ is the velocity of phase φ at well k, at sub-geology c,
$\mu_{\varphi c}$ is the viscosity of phase φ, at sub-geology c,
$P_{\varphi c}$ is the pressure of phase φ at sub-geology c,
$\rho_{\varphi c}$ is the density of phase φ, at sub-geology c,
g is the gravity vector,
k is a permeability coefficient, and
$k_{r\varphi c}$ is a relative permeability coefficient of phase φ, at sub-geology c. $k_{r\varphi c}$ is a function of time, through its dependency on phase saturation.

This feature explains what law is considered in practice for fluid transport and how it is parameterized.

According to another feature of the invention, the laws of reservoir physics further comprise heat transfer laws between a fluid or a gas and a rock given by the following formulas:

$$\Phi \partial_t(\rho_w S_w + \rho_g S_g) + \nabla \cdot (\rho_w u_w + \rho_g u_g) = 0$$

$$\Phi \partial_t(\rho_o S_o) + \nabla \cdot (\rho_o u_o) = 0$$

$$S_o + S_w S_g = 1$$

$$\partial_t(E_s + E_f) + \nabla \cdot (U_f - \lambda(T)\nabla T) = 0,$$

where
T=T(x,y,z) is the temperature and can vary over the reservoir,
Φ is the rock porosity,
$S_\varphi$ is the saturation of phase φ,
$\rho_\varphi$ is the density of phase φ,
$u_\varphi$ is the velocity of phase φ, E is the volumetric internal energy (indexes s and f corresponding respectively to solid and fluid phases), $U_f = U_g + U_o + U_w$, is the enthalpy flux, where $U_\phi = \rho_\phi h_\phi u_\phi$, $h_\phi$ is the specific enthalpy of phase $\phi$, $h_g = h_w + \Lambda$, $\Lambda$ being the specific heat of water vaporization, g, w, o indexes being respectively for gas, water and oil, $\lambda(T)$ is the reservoir conductivity coefficient.

This feature describes which heat transfer laws need to be considered and how they can be parameterized.

According to another feature of the invention, the laws of reservoir physics further comprise phase laws given by:

$\mu_{\phi c} = \mu_{\phi c}(P,T)$ the viscosity of phase $\phi$ at sub-geology c, function of the local pressure P and the local temperature T;

$\rho_{\phi c} = \rho_{\phi c}(P,T)$ the density of phase $\phi$ at sub-geology c, function of the local pressure P and the local temperature T;

$k_{r\phi c} = k_{r\phi c}(P,T)$ the relative permeability coefficient of phase $\phi$ at sub-geology c, function of the local pressure P and the local temperature T.

This feature explains how laws of fluid propagation and laws of heat transfer are coupled, through dependency of pressure and temperature.

According to another feature of the invention, laws of well physics comprise formulas:

$Q_{\phi ktc} = T_{kc}(PP_{ktc}, u_{\phi kc})$ where:

$Q_{\phi ktc}$ is the quantity produced of phase $\phi$ at well k in sub-geology c at time t, $T_{kc}$ is a transfer function of well k, in sub-geology c.

$PP_{ktc}$, are the production parameters applied to well k in sub-geology c at time t, $u_{\phi kc}$ is the velocity of phase $\phi$ at well k in sub-geology c.

This feature explains how wells behaviors can be modeled, for instance through transfer functions. Such functions have the same "fineness" than the modeling of the reservoir: if a sub-geology $G_c$ includes several layers b, these will be averaged out together at the well level.

An embodiment of the invention also concerns a method for optimally exploiting a mature hydrocarbon field, comprising the steps of:

building a production simulator according to any one of the preceding embodiments, iterating several runs of said production simulator in order to find the optimal production parameters optimizing a gain value derived from said quantity produced, applying said optimal production parameters so obtained to exploit the hydrocarbon field.

This feature describes a generic optimization process, aimed at maximizing a gain function on the field. It fully uses an aforementioned feature of the production simulator, namely its relative low-complexity, which allows very low computing time for calculating a given production scenario, defined by its corresponding production parameters. This low computing time renders possible playing a vast number of scenarios, typically more than 100 of them.

According to another feature of the invention, said optimized gain value is a net present value or reserves of said hydrocarbon field.

This feature illustrates a practical use of the invention, which turns out to generate large financial gains, against non-optimized scenarios.

According to another feature of the invention, said net present value can be determined using the formula:

$$NPV = \sum_i \left( \sum_k \sum_c P_{kc} * R_{ik} \right) * \frac{S_i}{(1+d)^i} - \sum_i \left( \sum_k I_{ik} - \sum_k OC_{ik} - \sum_k \sum_c (TO_i * P_{kc} + TL_i * L_{kc}) \right) * \frac{S_i}{(1+d)^i}$$

where:

$P_{kc}$ is oil production (in barrels) for well k and sub-geology c, $R_{ik}$ is tax and royalties for well k and year i, $S_i$ is the oil sale price (per barrel) for year i, d is the percentage discount rate, $I_{ik}$ is investment made on well k during year i, $OC_{ik}$ is operating costs for well k during year i, $L_{kc}$ is the liquid production (in barrels) for well k and sub-geology c, $TO_i$ is treatment cost (per barrel of oil), for year i.

$TL_i$ is treatment cost (per barrel of liquid), for year i.

This feature gives a practical way to define a gain function, which can be completely calculated using the production of wells, per phase per time and per sub-geology, which is itself calculated by the production simulator for any given set of production parameters.

BRIEF DESCRIPTION OF THE DRAWINGS

Others features, details and advantages of the invention will become more apparent from the detailed illustrating description given hereafter with respect to the drawings on which.

DETAILED DESCRIPTION OF THE PREFERRED EMBODIMENTS

Figure 1:
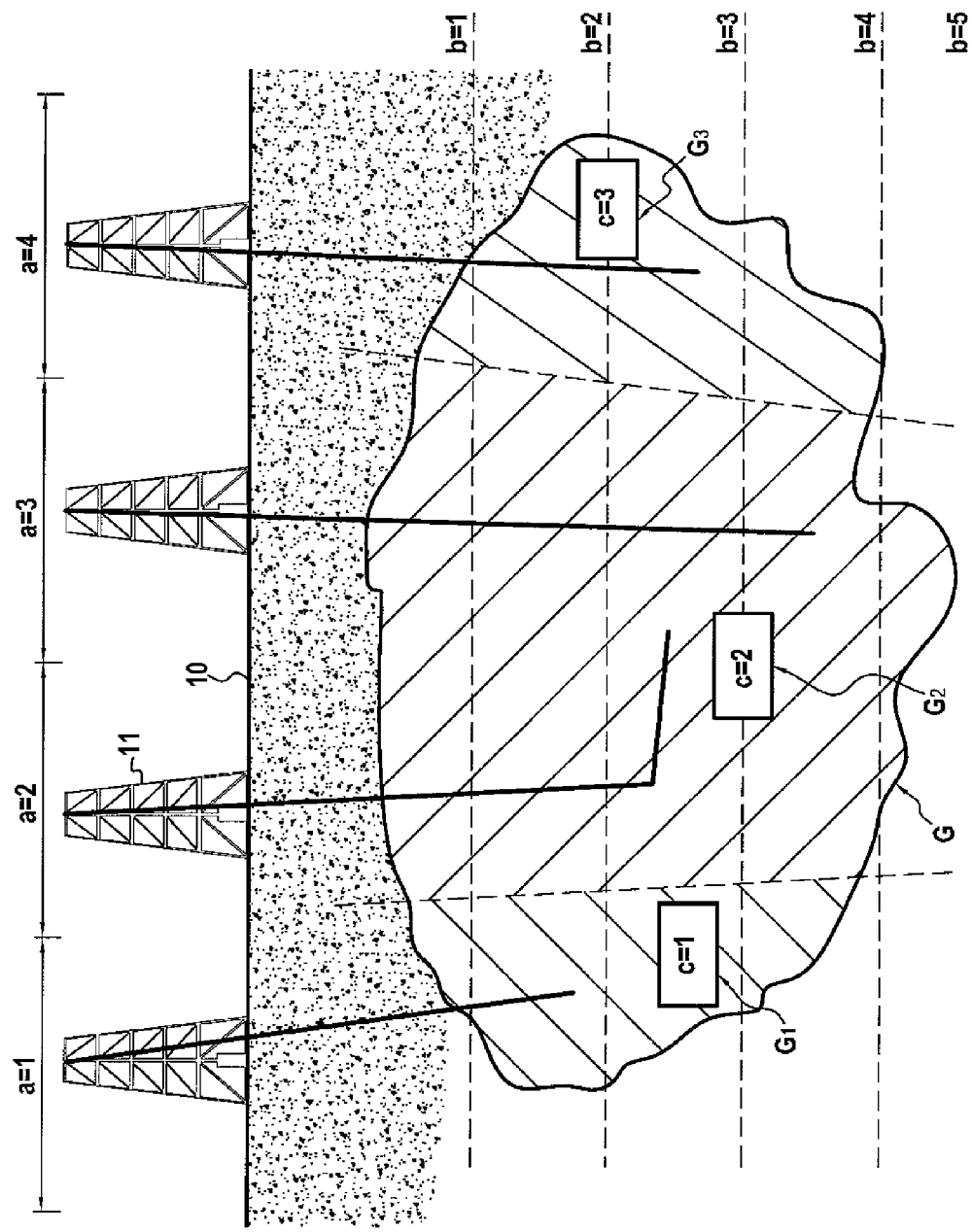
FIG. 1 shows an illustrative hydrocarbon field.

According to FIG. 1, a hydrocarbon field is a subterranean (or submarine) reservoir G comprising rock and gas and fluids of which oil. Said reservoir G is drilled from the surface 10 by several wells 11, in a known fashion. Said wells 11 may be injectors in charge of injecting a fluid, generally water, gas or steam, into the reservoir in order to change its properties, for instance to get its pressure or its temperature modified. Said wells 11 may instead be producers in charge of extracting gas, oil and associated fluids (and maybe other components) from the reservoir. Appropriate fluids or gas can also be injected into these producers, in order to enhance their production effectiveness or to get local reservoir properties to be modified.

An aim of the invention is to calculate future hydrocarbon production per well, per phase and per sub-geology over time.

Another aim of the invention is to determine and apply the optimal production parameters PP, that is, the production parameters PP that optimize a gain value e.g. the production, the NPV, reserves, of a mature hydrocarbon field.

An embodiment of the invention concerns a method, for optimally exploiting a mature hydrocarbon field, based on an optimizer 1. Said optimizer 1 uses a production simulator 2 module that provides quantities produced $Q_{\phi ckt}$ per phase $\phi$, per well k, 11, per sub-geology c, and per time t (said time is generally expressed in month) as a function of production parameters PP. The phase $\phi$ can be oil, gas, water or other relevant fluids like chemical additives (oil may be considered as a single phase or split into many different hydrocarbon phases). There can be several oil or gas phases, depending of hydrocarbons chains. Gas can be hydrocarbon, vapor or any other element.

Production parameters PP comprise all the driving parameters impacting the production. These production parameters include: injection rates that define the behavior of injectors or producers, production rates, e.g. in terms of pumping rates, that define the behavior of producers but also well work-over, like perforation, completion, acidification, fracturation ..., or some other impacting choices such as a possible conversion of a producer into an injector or else a drilling of an new additional well (be it a producer and/or an injector). PP can be sub-geology-dependent.

Such an optimizer 1 allows the test of new production strategies that would imply modifying production parameters against the baseline ("business as usual" production strategy).

Since said production simulator 2 is simple enough to quickly compute the result, the optimizer 1 may iterate many runs of said production simulator 2, thus trying a lot of strategies or scenarios, in order to find the optimal production parameters PP that optimize a gain value 5 derived from said quantity produced $Q_{\phi ckt}$.

Figure 2:
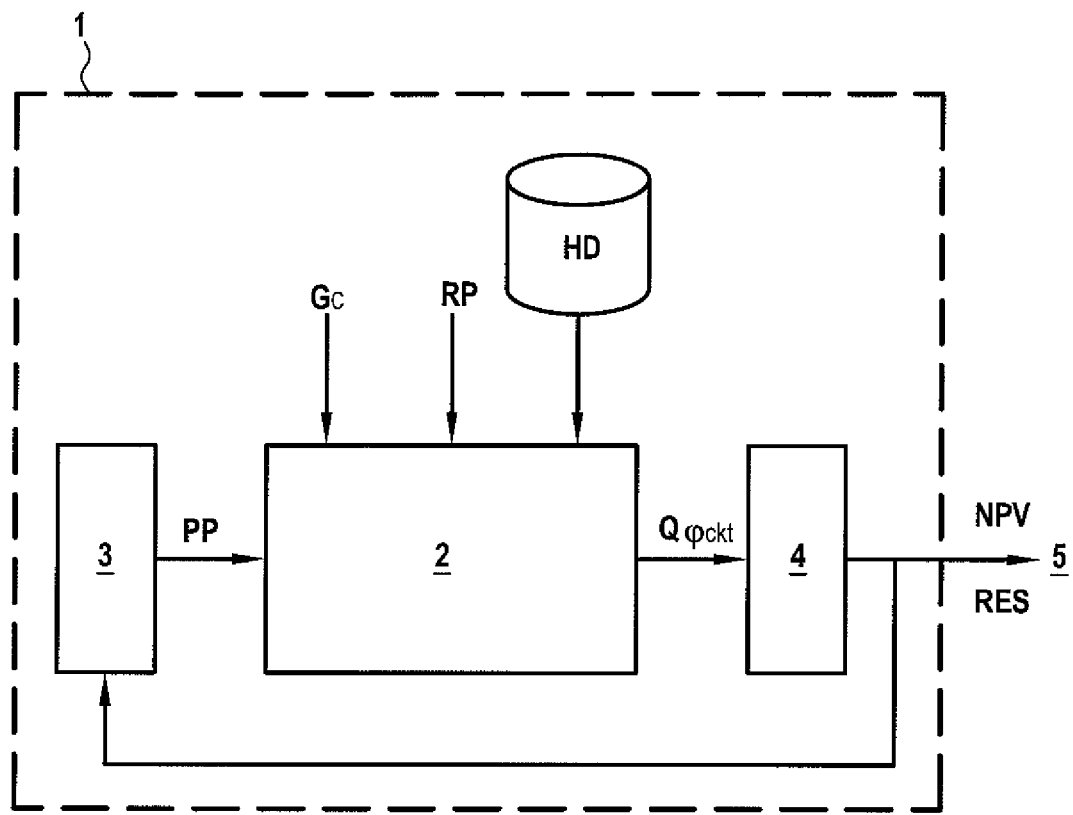
FIG. 2 is a block diagram of a whole simulator according to the invention.

As figured by block diagram of FIG. 2, the essential brick of optimizer 1 is production simulator 2. For a given set of production parameters PP, it provides a forecast of quantities produced $Q_{\phi ckt}$.

From said quantities produced $Q_{\phi ckt}$ a gain value 5, to be optimized, can be computed by a module 4.

In optimizer 1 a module 3 is in charge of proposing said scenarios in the form of sets of production parameters PP. Several heuristics/algorithms may be used in said module 3, ranging from random Monte-Carlo methods to more efficient context aware methods to propose relevant candidate sets of production parameters PP.

As is figured by a feedback arrow, said module 3 may take advantage of the feedback value 5, to determine new sets, and to drive toward new scenarios, according to known optimization methods.

By so iterating, optimizer 1 may determine an optimal set of production parameters that optimize the gain value 5.

The method also comprises applying said optimal production parameters PP so obtained to drive the exploitation of the hydrocarbon field. As simulated, the expected gain or revenue can be optimal and at least better than the baseline.

To be efficient, according to an essential feature of the invention, without reproducing the drawback of prior art solutions, said production simulator 2 must first match history data HD, that is provides a result that rather well compare to quantities produced $Q_{\phi ckt}$ for the past, when applying the production parameters PP historically applied, thus differentiating from too simpler models. Also, said production simulator 2 must verify a Vapnik condition.

The production simulator 2 is intended to produce estimated data for the future, starting from instant T, as accurate as possible. One necessary condition to pretend to such an accuracy is first that said production simulator matches history data HD, that is its reproduces known data in the past, that is so-called history data HD. Matching history data thus means the production simulator 2 is accurate enough to reproduce data produced such as quantities produced $Q_{\phi ckt}$ per phase $\phi$, per well k, per sub-geology c and per time t, and total cumulated oil, when known, that is before T. The quality of said match is appreciated by relatively comparing known quantities produced $Q_{\phi cktHD}$ recorded in history data HD to quantities produced $Q_{\phi ckt}$ as computed by mean of production simulator 2, to which past production parameters are applied. Cumulated oil produced is also compared between the sum of quantities produced $Q_{\phi cktHD}$ recorded in history data HD, and the sum of quantities produced $Q_{\phi ckt}$ as computed by mean of production simulator 2. Such a comparison can be expressed by $$\frac{\|Q_{\varphi ckt} - Q_{\varphi cktHD}\|_{[T_1-Xy,T_1]}}{\|Q_{\varphi cktHD}\|_{[T_1-Xy,T_1]}} \leq \varepsilon_1$$

for p % of the quantities $Q_{\phi cktHD}$ and $$\sum_{kct[T_1-Xy,T_1]} Q_{\varphi ckt} - \sum_{kct[T_1-Xy,T_1]} Q_{\varphi cktHD} \leq \varepsilon_2,$$

where $Q_{\phi ckt}$ are quantities produced per phase $\phi$, per well k, per sub-geology c and per time t, determined by the production simulator 2, $Q_{\phi cktHD}$ are the same quantities produced per phase $\phi$, per well k, per sub-geology c and per time t, found in history data (HD), $[T^1-Xy, T_1]$ is the time interval comprising the most recent X years before time $T_1$, $T_1$ being the last date for which history data HD is available, $\|Z\|_{[T_1,T_2]}$ denotes a norm of Z over time interval $[T_1,T_2]$, $\epsilon_1$ being a positive number small with respect to 1, and $\epsilon_2$ being a positive number small with respect to 1, p being a number close to 100%.

The length of the interval considered for the matching condition may be adapted to the available length of history data. However if possible, length of five years is considered to be satisfactory. Such a length is consistent with a comparable horizon of expected accurate forecast for the production simulator 2, of five years.

The particular values of X=5, p=90%, $\epsilon_1$=0.2 and $\epsilon_2$=0.15 have been found satisfactory to detect a good match.

The norm used herein for comparison may be any one among: least square or weighted least square.

In addition to the matching condition, an accurate production simulator 2 must also verify a Vapnik condition. Said Vapnik condition may be expressed in different ways.

One of the results of the learning theory as developed by Vapnik shows that, from a given history data HD set of dimension m, that is, comprising m independent measures, one can derive, by learning, a model within a space of VC-dimension h, with a reliability forecasting expected risk R($\alpha$) associated to parameters $\alpha$, bounded from above by the sum of two additive terms $R_{emp}(\alpha)+\Phi$. The first term $R_{emp}(\alpha)$ is an empirical risk associated with parameters $\alpha$, indicative of the quality of the matching to history data HD provided by said parameters $\alpha$. The second term $\Phi$ is characteristic of the model and can be expressed by $$\Phi\left(\frac{h}{m},\delta\right) = 2\sqrt{\frac{2}{m}\left(h\log\left(\frac{2em}{h}\right)+\log\left(\frac{2}{\delta}\right)\right)},$$

wherein $\delta$ is a positive number close to zero, 1-$\delta$ defining a probability of said forecast expected risk R($\alpha$) is indeed bounded by $R_{emp}(\alpha)+\Phi$, where h is the aforementioned VC-dimension of the space S of solutions, also named Vapnik-Chervonenkis or VC dimension, and m is the aforementioned number of independent measures available in history data HD.

According to said result, prior art oversimplified models all suffer form a high $R_{emp}(\alpha)$ due to the over simplification of the model. Instead, prior art complex meshed models may provide a small $R_{emp}(\alpha)$, but suffer from a high $\Phi$ value, due to an high h/m ratio, since the VC-dimension h of the space of solutions is too large with respect to the number m of independent measures available in history data HD.

A trade-off has then to be reached. m value is constant and given by history data HD available for a given hydrocarbon field. The size h of the space of solutions has then to be adapted so that the h/m ratio remains small. With an average objective of a five years forecast with a reliability of around +/−5%, a value $$\frac{h}{m} \leq 0,1$$

has been found to be compatible with both the objective reliability and the possibility of scaling, as will be detailed further, to obtain a model.

Another way to express and check said Vapnik condition is by realizing a blind test. A blind test over N years may be realized by parting history data into two time intervals. A first "past" interval runs from an initial time $T_0$ for which history data are available, to a time T−Ny preceding the final time T by N years. A second "blind" interval runs from T−Ny to time T corresponding to the last time for which history data is available. T is generally the actual time. The data of "past" interval are considered as known, and are used to build a matching production simulator 2, by learning on said data. The data of "blind" interval are considered unknown or at least are concealed during the building of production simulator. They are then compared to data forecast by production simulator 2 over said "blind" interval given production parameters over the "blind" interval. A blind test is considered satisfactory when the forecast data reproduce with enough accuracy the history data over said concealed interval.

A blind test then comprises the following steps:
  determining a production simulator 2 matching history data HD over a time interval preceding T−Ny,
  forecasting quantities produced over a time interval [T−Ny, T],
  the blind test being satisfactory when:

$$\frac{\|Q_{\varphi ktb} - Q_{\varphi ktbHD}\|_{[T-Ny,T]}}{\|Q_{\varphi ktbHD}\|_{[T-Ny,T]}} \leq \varepsilon_1,$$

for more than p % of existing $Q_{\varphi ktbHD}$ values and the cumulated oil produced over the same [T−Ny, T] time interval is accurate up to $\varepsilon_2$, where $Q_{\varphi ktb}$ are quantities produced per phase, per well, per layer (or group of layers) and per time, determined by the production simulator, $Q_{\varphi ktbHD}$ are the same quantities produced per phase, per well, per layer (or group of layers) and per time, found in history data,

[T−Ny, T] is the time interval comprising the most recent N years before time T, T being the last date for which history data is made available, $\|Z\|_{[T_1,T_2]}$ denotes a norm of Z over time interval $[T_1,T_2]$,
$\varepsilon_1$ being a positive number small with respect to 1, and
$\varepsilon_2$ being a positive number small with respect to 1, and p being a positive number close to 100%.

The particular values of p=90%, $\varepsilon_1$=0.1 and $\varepsilon_2$=0.1 have been found satisfactory to assert a good blind test. A period of N=3 years is also satisfactory.

The norm used herein for comparison may be any one, for instance: least square or weighted least square.

Another way to check the Vapnik condition is expressed by measuring a forecast stability property. Such property test the stability of the production simulator 2 toward its output data in response of a slight variation of the input data. Input data are history data HD comprising production parameters PP and quantities produced $Q_{\varphi ktbHD}$ in the past, that is over a $[T_0, T]$ time interval. Based on these nominal data PP and $Q_{\varphi ktbHD}$ a nominal production simulator 2 is built.

These data are then slightly varied to obtain corresponding data PP' and $Q_{\varphi ktbHD}$'. Based on these slightly varied input data another production simulator is built that is expected to be close enough to nominal production simulator 2.

Output data, that is quantities produced $Q_{\varphi ktb}$ and $Q_{\varphi ktb}$' are forecast respectively by nominal production simulator 2 and by other production simulator, over a future time interval [T, T+My], and are then compared.

The forecast stability property is verified when $$\frac{\|PP - PP'\|_{[T_0,T]}}{\|PP\|_{[T_0,T]}} \leq \varepsilon \text{ and } \frac{\|Q_{\varphi ktbHD} - Q'_{\varphi ktbHD}\|_{[T_0,T]}}{\|Q_{\varphi ktbHD}\|_{[T_0,T]}} \leq \varepsilon \text{ implies that } \frac{\|Q_{\varphi ktb} - Q'_{\varphi ktb}\|_{[T,T+My]}}{\|Q_{\varphi ktb}\|_{[T,T+My]}} \leq n\varepsilon$$

where
PP are production parameters,
PP' are slightly varying production parameters,
$Q_{\varphi ktbHD}$ are quantities produced per phase φ, per well k, per layer (or group of layers) b and per time t, found in history data HD,
$Q_{\varphi ktbHD}$' are slightly varying quantities produced per phase φ, per well k, per layer (or group of layers) b and per time t, found in a slightly varying history data,
$Q_{\varphi ktb}$ are quantities produced per phase φ, per well k, per layer (or group of layers) b and per time t, determined by the production simulator 2,
$Q_{\varphi ktb}$' are quantities produced per phase φ, per well k, per layer (or group of layers) b and per time t, determined by an other close enough production simulator determined out of slightly varying history data,
$[T_0, T]$ is the time interval from time $T_0$ to time T, being respectively the initial and the last date for which history data (HD) is available,
[T, T+My] is the time interval comprising the M years after time T,
$\|Z\|_{[T_1,T_2]}$ denotes a norm of Z over time interval $[T_1,T_2]$,
$\varepsilon$ being a positive number small with respect to 1, and
n being a small integer lesser than 5.

The important value here is the ratio n between the input variation allowed $\varepsilon$, and the output variation n$\varepsilon$ obtained. The values of $\varepsilon$=0.05, n=2 have been found satisfactory. A horizon of M=3 years is also satisfactory when considering the accuracy objectives.

The norm used herein for comparison may be any one, for instance: least square or weighted least square.

The three described ways to check the Vapnik condition can be use either separately or concurrently.

As already mentioned, the heart of the invention is the production simulator 2. Said production simulator 2 may use behavioral physics laws such as reservoir physics laws 6 and well physics laws 7 in order to be sufficiently precise to accurately match the history data HD. However the VC-dimension h of the space of solutions S must remain small enough so as to verify said Vapnik condition.

Two approaches are proposed here to reach such result. Both approaches comprise using physics laws and applying them to a reservoir model.

In a first approach, also called upscaling, both said reservoir model and physics laws start with detailed formulations that are gradually simplified/scaled by approximating when and where some homogeneity can be observed, until a stop condition is reached. Said condition is reached by upscaling a reservoir partition, rock properties RP, laws of reservoir physics 6 and laws of well physics 7 until said Vapnik condition is verified.

According to a second approach, also called downscaling, both said reservoir model and physics laws start with coarse formulations that are gradually complexified/scaled by detailing when and where some substantial variation can be observed, until a stop condition is reached. Said condition is reached by downscaling a reservoir partition, rock properties RP, laws of reservoir physics 6 and laws of well physics 7 will keeping said Vapnik condition verified, until the production simulator 2 matches history data HD.

Both approaches may be used alone separately or may be used alternately. For instance, one may upscale the geology from a fine model by merging parts, and then locally downscale back one sub-geology that cannot be matched, thus revealing a substantial change of properties inside.

At this step, whatever the approach used, the structure of the production simulator 2 is defined. However, said production simulator 2 depends on several parameters $\alpha$, that must be further trimmed in order for the production simulator 2 to be operative. Depending on parameters $\alpha$, several production simulators 2 may be candidate solutions. These several candidate solutions are checked against a forecast expected risk $R(\alpha)$ for each possible set of parameters $\alpha$ until finding the optimal set of parameters $\alpha$ minimizing said expected risk $R(\alpha)$.

According to FIG. 1, a reservoir G may be modeled by considering its geology, that is, the closure of the rock volume containing oil, and parting it using a reservoir partition.

When using an upscaling approach, a first fine partition may be defined by crossing x-y areas indexed by letter a, each e.g. comprising at least one well 11, and z areas indexed by letter b. In the example of FIG. 1, four such x-y areas (a= 1 ... 4) are used and five (b=1 ... 5) z areas are used to initially part the reservoir G. The reservoir G is thus initially parted into elementary parts $G_{ab}$ such that $$G = \bigcup_{a=1}^{A} \bigcup_{b=1}^{B} G_{ab}$$

with $G_{ab} \cap G_{a'b'} = \emptyset$ for $(a,b) \neq (a',b')$ (two different parts are disjoined), where $a \in \{1 \ldots A\}$ describes a x-y area, and $b \in \{1 \ldots B\}$ describes a z layer.

Starting from this initial reservoir partition, said partition is upscaled by considering elementary parts $G_{ab}$, and gradually merging adjacent ones together when they exhibit homogeneous rock properties RP. The result is a new coarser partition, comprising sub-geologies $G_c$ where $c \in \{1 \ldots C\}$. In FIG. 1, three such sub-geologies are shown. $G_1$ gathers $G_{11}$, $G_{12}$, $G_{13}$, $G_{14}$ and $G_{15}$, exhibiting a homogenous behavior. $G_2$ gathers $G_{21}$, $G_{22}$, $G_{23}$, $G_{24}$, $G_{25}$, $G_{31}$, $G_{32}$, $G_{33}$, $G_{34}$ and $G_{35}$. $G_3$ gathers $G_{31}$, $G_{32}$, $G_{33}$, $G_{34}$ and $G_{35}$. In real cases a sub-geology typically includes from 3 to 50 wells. Said upscaling of the geology partition is a first way to reduce the dimension h of the space of solutions S. The size of the space of solutions then depends on the number of geologies which is of an order of few units instead of over 100 000s cells as in a meshed prior art model.

When using a downscaling approach, the process starts from a coarse partition, e.g. composed of a single part corresponding to the whole reservoir G. Said coarse partition s then parte into sub-geologies $G_c$ where $c \in \{1 \ldots C\}$ where and every time a substantial change of properties is present around the boundary between said sub-geologies. So doing, a homogeneous behavior may be expected in every sub-geology, while keeping the number of such sub-geologies as reduced as possible.

Rock properties RP comprises mainly the rock porosity, permeability k and relative permeability $k_{r\phi c}$, used to determine the dynamic of fluid through rock, but also other property such as net pay, heat capacity or conductivity, as relevant. Since the sub-geology becomes the new elementary volume unit, all of these rock properties RP, are considered to be fairly constant over a given sub-geology $G_c$.

When using a upscaling approach rock properties RP are homogenized over each sub-geology $G_o$ according to averaging formula:

$$RP_c = \frac{1}{V_c} \int\int\int_{G_c} RP(x, y, z) dx\, dy\, dz,$$

where is the volume of sub-geology $G_c$.

When instead using a downscaling approach, rocks properties (RP) are downscaled by defining new separate rock properties $RP_c$ over each new sub-geology ($G_c$) obtained by parting along a discontinuity.

Figure 3:
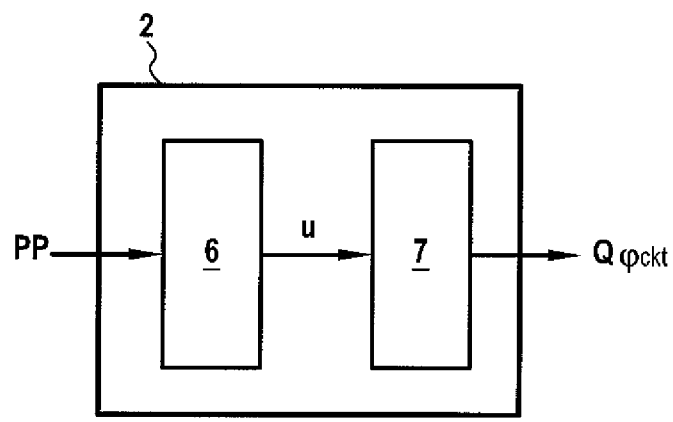
FIG. 3 is a block diagram detailing a production simulator according to the invention.

With respect to FIG. 3, is now described in more details the content of production simulator 2. Said production simulator 2 module may be parted into two main modules 6, 7. A first module implements laws of reservoir physics 6. Given a set of production parameters PP, said module provides dynamic characteristics of the fluids across the reservoir, at least at the entrance of each well 11 and at each sub-geology b. Said dynamic characteristics are e.g. expressed as a velocity field.

Said laws of reservoir physics 6 are either upscaled or downscaled in such a way they apply with functioning parameters of the sub-geology $G_c$. Also, space and times scales associated with the sub-geology $G_c$ are determined in such a way that the associated space of solutions is consistent with the complexity of history data HD at the well level. For instance, if insufficient data richness is available on layer-related production (m too small), well production will be summed up, partially (some layers are grouped) or totally (all layers are grouped):

$$Q_{\varphi k t} = \sum_{b \in \{1 \ldots B\}} Q_{\varphi k t b}$$

In such instance, the production simulator 2 only describes production per well and not production per well and per layer (or group of layers).

The upscaling/downscaling process also applies to the laws. A variation in number and complexity of laws of physics and of well may be obtained by using more simple or instead more detailed behavior models and formulas. For instance Darcy's law is a simplification of the more general Navier Stokes's law. The order of the formulas can also be changed either increased or decreased according to the Vapnik condition intended. Some parameters may either be constant or refined by a varying function of another parameter or variable. Depending on the way the field has been exploited so far, heat transfer can be considered or not, thus employing or disregarding heat transfer laws.

In a similar fashion, well transfer functions may sometimes be linearized or approximated around their functioning point.

Such concordance is to be considered on partial time intervals or on partial spatial areas of the hydrocarbon field in accordance with the richness (dimension m) of detail of data available in history data RD.

The laws of reservoir physics 6 are, in a known manner, derived from the (Navier)-Stokes equations of conservation of momentum and conservation of mass for a fluid, said fluid successively corresponding to phases, evolving in a rock modeled as a porous medium only characterized by its averaged porosity $\Phi$, permeability k and relative permeability $k_{r\phi c}$.

Usual laws of reservoir physics 6 are derived by using general flow model such as the Navier-Stokes equations coupled with multiphase transport considered at the microscopic scale. Fluids are evolving in a domain obtained as the complement of rock, which may contain a large variety of obstacle topologies and geometries. The upscaling/downscaling process consists in determining the effective dynamics of fluids in the porous medium in which the rock structure is only described by the average porosity, permeability and relative permeability at a given time t.

Fluid propagation in the reservoir G is derived from the general Navier-Stokes equations, which describe conservation of momentum for a fluid:

$$\rho\left(\frac{\partial u}{\partial t} + (u \cdot \nabla)u\right) = -\nabla p + \nabla \cdot T + f$$

where u is the fluid velocity, $\rho$ is the fluid density, T the stress tensor and f body forces acting on the fluid (for oil in a reservoir, f is the gravity: f=$\rho \cdot$g).

These are complemented by the conservation of fluid mass:

$$\frac{\partial u}{\partial t} + \nabla \cdot (\rho u) = 0$$

And for each phase $\phi \in$ {oil, water, gaz}:

$$\frac{\partial(\rho S_\varphi)}{\partial t} + \nabla \cdot (\rho S_\varphi u) = \nabla \cdot J_\varphi$$

Where $S_\phi$ denotes phase $\phi$ saturation and $J_\phi$ diffusion flux. Of course, one has:

$$\sum_\varphi S_\varphi = 1 \text{ and } \sum_\varphi J_\varphi = 0$$

Since reservoir flows are usually characterized by small Reynolds numbers, i.e. creeping flows, the Navier-Stokes equations can generally be simplified into Stokes equations, assuming stationary, incompressible flow:

$$\mu \nabla^2 u_i + \rho g_i - \partial_i p = 0 \text{ and } \nabla \cdot u = 0$$

where $\mu$ is the viscosity, $u_i$ is the velocity in the i direction, $g_i$ is the gravity component in direction i and p is the pressure.

Using a volume averaging procedure, the Stokes equations may be homogenized so that the effective viscous resisting force is proportional to the velocity, and opposite in direction. One may therefore write in the case of isotropic porous media $$-\frac{\mu \Phi}{k} u_i + \rho g_i - \partial_i p = 0,$$

where k denotes the permeability of the porous medium and $\Phi$ is the porosity. This gives the velocity in terms of pressure gradient $$u_i = -\frac{k}{\Phi \mu}(\partial_i p - \rho g_i),$$

which gives Darcy's law. In the case of anisotropic porous media, one ends up with $$u_i = -\frac{1}{\Phi \mu} \sum_j K_{ij}(\partial_j p - \rho g_j),$$

where K denotes the symmetric permeability tensor. The resulting equation of mass conservation of fluid is given by $$\frac{\partial(\rho \Phi)}{\partial t} + \nabla \cdot (\rho u) = 0.$$

Actually, the fluid is generally made of gas (g), oil (o) and water (w), whose composition might be complex, depending for instance on their salinity and hydrocarbon chains. Mass conservation of phase $\phi \in$ {o,w,g} at the upscaled level may be written as:

$$\frac{\partial(\rho_\varphi S_\varphi \Phi)}{\partial t} + \nabla \cdot (\rho_\varphi u_\varphi) = 0$$

where $u_\phi$, $\rho_\phi$, $S_\phi$ respectively denote the velocity, density, saturation and diffusion flux of phase $\phi$.

In any case, one has to determine closure laws for phase velocity $u_\phi$ in terms of average flow characteristics like velocity u and pressure p and phase φ saturation. Consistency relations have to be satisfied such as $$\sum_\varphi S_\varphi = 1.$$

Closure of phase φ velocity involves the so-called relative permeability coefficient $k_{r\varphi}$ accounting for differential mobility of phases $$u_{\varphi k} = -\frac{k}{\mu_\varphi} k_{r\varphi} (\nabla P_\varphi - \rho_\varphi g)$$

where $\mu_\varphi$ denotes the viscosity of phase φ.

Finally module 6 implements the laws of reservoir physics by following formulas:

$$u_{\varphi kc} = -\frac{k}{\mu_{\varphi c}} k_{r\varphi c} (\nabla P_{\varphi c} - \rho_{\varphi c} g),$$

where:
- $u_{\varphi kc}$ is the velocity of phase φ at well k, in sub-geology c,
- $\mu_{\varphi c}$ is the viscosity of phase φ, in sub-geology c,
- $\rho_{\varphi c}$ is the density of phase φ, in sub-geology c,
- $P_{\varphi c}$ is the pressure of phase φ, in sub-geology c,
- g is the gravity vector,
- k is a permeability coefficient, and
- $k_{r\varphi c}$ is a relative permeability coefficient of phase φ, in sub-geology c.

The laws of reservoir physics 6 may also comprise, if corresponding data are available in history data HD, heat transfer laws between a fluid or a gas and a rock given by the following formulas:

$$\Phi \partial_t (\rho_w S_w + \rho_g S_g) + \nabla \cdot (\rho_w u_w + \rho_g u_g) = 0$$

$$\Phi \partial_t (\rho_o S_o) + \nabla \cdot (\rho_o u_o) = 0,$$

$$S_o + S_w S_g = 1,$$

$$\partial_t (E_s + E_f) + \nabla \cdot (U_f - \lambda(T) \nabla T) = 0,$$

where
T=T(x,y,z) is the temperature and can vary over the reservoir,
Φ is the rock porosity,
$S_\varphi$ is the saturation of phase φ,
$\rho_\varphi$ is the density of phase φ,
$u_\varphi$ is the velocity of phase φ,
E is the volumetric internal energy (indexes s and f corresponding respectively to solid and fluid phases),
$U_f = U_g + U_o + U_w$ is the enthalpy flux, where $U_\varphi = \rho_\varphi h_\varphi u_\varphi$,
$h_\varphi$ is the specific enthalpy of phase φ,
$h_g = h_w + \Lambda$, Λ being the specific heat of water vaporization,
g, w, o indexes being respectively for gas, water and oil,
λ(T) is the reservoir conductivity coefficient.

Additionally, some variables in the production simulator 2 may be constant or may be detailed by considering them as variables e.g. of local pressure P and the local temperature T. So the laws of reservoir physics 6 may further comprise phase laws given by:
$\mu_{\varphi c} = \mu_{\varphi c}(P,T)$ the viscosity of phase φ at sub-geology c, function of the local pressure P and the local temperature T;
$\rho_{\varphi c} = \rho_{\varphi c}(P,T)$ the density of phase φ at sub-geology c, function of the local pressure P and the local temperature T;
$k_{r\varphi c} = k_{r\varphi c}(P,T)$ the relative permeability coefficient of phase φ at sub-geology c, function of the local pressure P and the local temperature T.

From said velocities $u_{\varphi kc}$, known at least at a perforation in layers of the sub-geology c of each well k, second module 7, implementing well models in the form of laws of well physics 7, determines the quantities produced $Q_{\varphi ktc}$ of phase φ in sub-geology c, at well k at time t, in function of the production parameters $PP_{ktc}$ applied to each well k, in sub-geology c, at time t, and of the velocity $u_{\varphi kb}$ of phase φ at layer b at well k, using formulas: $Q_{\varphi ktc} = T_{kc}(PP_{ktc}, u_{\varphi kc})$ where $T_{kc}$ is a transfer function defined for each well k and each sub-geology c. Such transfer functions are functions depending, inter alia, on local reservoir pressure, geology, skin effect, well/pump design and completion. They can vary over time, as a result of ageing or damage. They are usually tabulated functions, which are derived from past production data.

The space of solutions candidate for becoming a production simulator 2 of the hydrocarbon field, is the combination of T (well transfer physics) and u (propagation physics of the reservoir). Each such candidate is associated to and defined by a set of parameters α. These parameters α are those defining the candidate simulator that will link input production parameters $PP_{ktc}$ to the quantities produced $Q_{\varphi ktc}$. The space of candidate simulators in which they are defined is the result of the upscaling/downscaling process of the reservoir, wells and laws. The simulator, defined by such parameters α will fully characterize the field behavior, well by well, sub-geology by sub-geology, as a response to given $PP_{ktc}$. These are valid for a given space of allowed values for input production parameters. Said space of allowed values is typically not greater than the envelope of all past production parameters, with an additional variation of +/−30%.

Based on the history data HD, each production simulator candidate solution is compared against passed data. The candidate solution whose set of parameters minimizes the forecast expected risk R(α) is determined by iteration over said sets of parameters α.

In the case of mature fields, the amount m of past production or history data HD is large enough to allow defining a space of solutions S embedding the appropriate physical richness able to capture all key phenomena that (have and) will matter for the future production of the same wells. Such situation allows a trade-off for which the VC-dimension h of space of solutions is suitable with respect to the complexity of available data, therefore minimizing the h/m ratio and hence the Φ and the R(α) values. The forecast expected risk R(α) is minimized and the forecast provided by the production simulator 2 may be considered reliable.

For each candidate solution, the forecast expected risk R(α) is bounded from above using the Vapnik formula:

$$R(\alpha) \le R_{emp}(\alpha) + \Phi\left(\frac{h}{m}, \delta\right)$$

R(α) is the forecast expected risk associated with parameters α,
$R_{emp}(\alpha)$ is an empirical risk associated with parameters α, determined by a matching process with history data HD,
δ is a positive number close to zero, 1-δ defining a probability that the inequality holds, and Φ is a function defined by:

$$\Phi\left(\frac{h}{m}, \delta\right) = 2\sqrt{\frac{2}{m}\left(h\log\left(\frac{2em}{h}\right) + \log\left(\frac{2}{\delta}\right)\right)},$$

where
h is the Vapnik-Chervonenkis dimension of the space of solutions, and
m is the number of independent measures available in history data HD,
e is equal to exp(1).

The best retained production simulator 2 is determined and defined by a set of optimal parameters $\alpha_{opt}$ that minimizes the forecast expected risk $R(\alpha)$.

Once a production simulator 2 is thus determined and optimized so as to respect the matching condition, the Vapnik condition and to minimize the forecast expected risk $R(\alpha)$, it can be used inside an optimizer 1. The optimizer 1 generates scenarios of production parameters PP and applies the production simulator 2 over these scenarios. Many such runs are then iterated over different sets of production parameters PP. At each iteration, a gain value 5 is calculated derived from the quantity produced $Q_{\phi ktc}$ forecast by production simulator 2. The resulting gain value 5 may be used to select the next scenario. So doing an optimal set of production parameters PP can be obtained that optimize said gain value 5.

Said optimized gain value 5 can be a net present value NPV or reserves RES of the hydrocarbon field.

Any gain values 5 can be determined by module 4 from quantities produced $Q_{\phi ktc}$ output by optimizer 1, by taking into account the necessary economic parameters or indexes, as is well known by the one skilled in the art.

Said net present value NPV may e.g. be determined using the formula:

$$NPV = \sum_i \left(\sum_k \sum_c P_{kc} * R_{ik}\right) * \frac{S_i}{(1+d)^i} -$$

$$\sum_i \left(\sum_k I_{ik} - \sum_k OC_{ik} - \sum_k \sum_c (TO_i * P_{kc} + TL_i * L_{kc})\right) * \frac{S_i}{(1+d)^i}$$

where:
$P_{kc}$ is oil production (in barrels) for well k and sub-geology c,
$R_{ik}$ is tax and royalties for well k and year i,
$S_i$ is the oil sale price (per barrel) for year i,
d is the percentage discount rate,
$I_{ik}$ is investment made on well k during year i,
$OC_{ik}$ is operating costs for well k during year i,
$L_{kc}$ is the liquid production (in barrels) for well k and sub-geology c,
$TO_i$ is treatment cost (per barrel of oil), for year i.
$TL_i$ is treatment cost (per barrel of liquid), for year i An alternate choice is reserves RES value of the hydrocarbon field, defined as the cumulative oil produced over a given time period. Others choices are possible.

What is claimed is:

1. A non-transitory computer readable medium storing a computer program which when executed by a processor of a computer performs a method of producing a production simulator, for simulating a mature hydrocarbon field, providing quantities produced per phase, per well, per layer or group of layers and per time as a function of production parameters, wherein said production simulator is defined by a set of parameters α within a space of solutions, matches history data of said mature hydrocarbon field and exhibits a good forecast reliability, which can be characterized, according to a Statistical Learning Theory, by low forecast expected risk $R(\alpha)$ associated with said parameters α, the method comprising the steps of:
defining initial detailed reservoir partition, rock properties, laws of reservoir physics and laws of well physics,
upscaling said reservoir partition, rock properties, laws of reservoir physics and laws of well physics until a Vapnik condition is verified, and
optimizing said production simulator by choosing from among production simulator candidate solutions, a candidate solution minimizing a forecast expected risk $R(\alpha)$.

2. The non-transitory computer readable medium of claim 1, wherein the production simulator defined by a set of parameters α within a space of solutions, can demonstrate a low forecast expected risk $R(\alpha)$, as it will minimize a boundary condition $$R_{emp}(\alpha) + \Phi\left(\frac{h}{m}, \delta\right),$$

which is derived from the Vapnik inequality:

$$R(\alpha) \leq R_{emp}(\alpha) + \Phi\left(\frac{h}{m}, \delta\right)$$

$R(\alpha)$ is the forecast expected risk associated with parameters α,
$R_{emp}(\alpha)$ is an empirical risk associated with parameters α, determined by a matching process with history data,
δ is a positive number close to zero, 1-δ defining a probability that the inequality holds, and
Φ is a function defined by:

$$\Phi\left(\frac{h}{m}, \delta\right) = 2\sqrt{\frac{2}{m}\left(h\log\left(\frac{2em}{h}\right) + \log\left(\frac{2}{\delta}\right)\right)},$$

where
h is the Vapnik-Chervonenkis dimension of the space of solutions S, and
m is the number of independent measures available in history data,
e is equal to exp(1).

3. The non-transitory computer readable medium of claim 1, wherein a match with history data is obtained when:

$$\frac{\|Q_{\phi ktb} - Q_{\phi ktbHD}\|_{[T_1-Xy,T_1]}}{\|Q_{\phi ktbHD}\|_{[T_1-Xy,T_1]}} \leq \varepsilon_1,$$

for p % of the existing $Q_{\phi ktbHD}$ values and the cumulated oil produced over the same $[T_1-Xy, T_1]$ time interval is accurate up to $\varepsilon_2$, where
$Q_{\phi ktbHD}$ are quantities produced per phase φ, per well k, per layer or group of layers b and per time t, determined by the production simulator 2, $Q_{\phi ktbHD}$ are the same quantities produced per phase φ, per well k, per layer or group of layers b and per time t, found in history data,

[$T_1$–Xy, $T_1$] is the time interval comprising the most recent X years before time $T_1$, $T_1$ being the last date for which history data (HD) is available, $\|Z\|_{[T_1,T_2]}$ denotes a norm of Z over time interval [$T_1$, $T_2$], $\epsilon_1$ being a positive number small with respect to 1, $\epsilon_2$ being a positive number small with respect to 1, and p being a positive number close to 100%.

4. The non-transitory computer readable medium of claim 3, where X=5, $\epsilon_1$=0.2, $\epsilon_2$=0.15 and p=90%.

5. The non-transitory computer readable medium of claim 1, wherein the Vapnik condition is expressed as $$\frac{h}{m} \le 0, 1,$$

where:

h is the Vapnik-Chervonenkis dimension of the space of solutions, and m is the number of independent measures available in history data.

6. The non-transitory computer readable medium of claim 1, wherein the Vapnik condition is verified by realizing a satisfactory blind test over N years, as defined by the following steps:

determining a production simulator matching history data over a time interval preceding T−Ny, forecasting quantities produced over a time interval [T−Ny, T] given production parameters over the same interval, the blind test being satisfactory when:

$$\frac{\|Q_{\phi ktb} - Q_{\phi ktbHD}\|_{[T-Ny,T]}}{\|Q_{\phi ktbHD}\|_{[T-Ny,T]}} \le \varepsilon_1$$

for p % of all $Q_{\phi ktbHD}$ values, and the cumulated oil produced over the same [T−Ny, T] time interval is accurate up to $\epsilon_2$, where $Q_{\phi ktb}$ are quantities produced per phase φ, per well k, per layer or group of layers b and per time t, determined by the production simulator, $Q_{\phi ktbHD}$ are the same quantities produced per phase φ, per well k, per layer or group of layers b and per time t, found in history data,

[T−Ny, T] is the time interval comprising the most recent N years before time T, T being the last date for which history data HD is made available, $\|Z\|_{[T_1,T_2]}$ denotes a norm of Z over time interval [$T_1$,$T_2$], $\epsilon_1$ being a positive number small with respect to 1, $\epsilon_2$ being a positive number small with respect to 1, and p being a number close to 100%.

7. The non-transitory computer readable medium of claim 6, where p=90%, $\epsilon_1$=0.1 and $\epsilon_2$=0.1 and N=3.

8. The non-transitory computer readable medium of claim 1, wherein the Vapnik condition is a forecast stability property verified when if $$\frac{\|PP - PP'\|_{[T_0,T]}}{\|PP\|_{[T_0,T]}} \le \varepsilon$$

-continued and $$\frac{\|Q_{\phi ktbHD} - Q'_{\phi ktbHD}\|_{[T_0,T]}}{\|Q_{\phi ktbHD}\|_{[T_0,T]}} \le \varepsilon$$

then $$\frac{\|Q_{\phi ktb} - Q'_{\phi ktb}\|_{[T,T+Ny]}}{\|Q_{\phi ktb}\|_{[T,T+Ny]}} \le n\varepsilon$$

where

PP are production parameters,

PP' are slightly varying production parameters, $Q_{\phi ktbHD}$ are quantities produced per phase φ, per well k, per layer or group of layers b and per time t, found in history data, $Q_{\phi ktbHD}'$ are slightly varying quantities produced per phase φ, per well k, per layer or group of layers b and per time t, found in a slightly varying history data, $Q_{\phi ktb}$ are quantities produced per phase φ, per well k, layer or group of layers b and per time t, determined by the production simulator, $Q_{\phi ktb}'$ are quantities produced per phase φ, per well k, per layer or group of layers b and per time t, determined by an other close enough production simulator determined out of slightly varying history data,

[$T_0$, T] is the time interval from time $T_0$ to time T, being respectively the initial and the last date for which history data is available,

[T, T+Ny] is the time interval comprising the N years after time T, $\|Z\|_{[T_1,T_2]}$ denotes a norm of Z over time interval [$T_1$,$T_2$], ε being a positive number small with respect to 1, and n being a small integer lesser than 5.

9. The non-transitory computer readable medium of claim 8, where ε=0.05, n=2 and N=3.

10. The non-transitory computer readable medium of claim 1, wherein said reservoir partition is upscaled following the steps of:

partitioning a reservoir G into elementary parts $G_{ab}$, such that $$G = \bigcup_{a=1}^{A} \bigcup_{b=1}^{B} G_{ab}$$

with $G_{ab} \cap G_{a'b'} = \emptyset$ for (a,b)≠(a',b'), where a ∈ {1 ... A} describes a x-y area, and b ∈ {1 ... B} describes a z layer, grouping adjacent elementary parts $G_{ab}$ exhibiting homogeneous rock properties, into sub-geologies $G_c$ where c ∈ {1 ... C}.

11. The non-transitory computer readable medium of claim 1, wherein rocks properties are upscaled by following a step of averaging out rock properties $RP_c$ over each sub-geology $G_c$, according to formula:

$$RP_c = \frac{1}{V_c} \int_{G_c} \int \int RP(x, y, z) dx dy dz,$$

where $V_c$ is the volume of sub-geology $G_c$.

12. The non-transitory computer readable medium of claim 1,
wherein laws of reservoir physics are upscaled in such a way they apply with functioning parameters of the sub-geology $G_c$ and wherein space and times scales associated with the sub-geology $G_c$ are determined in such a way that the associated space of solution is consistent with the complexity of history data at the well level.

13. The non-transitory computer readable medium claim 1, wherein the laws of reservoir physics are derived from the (Navier-) Stokes equations of conservation of momentum and conservation of mass for a fluid evolving in a rock modeled as a porous medium only characterized by its averaged porosity, permeability and relative permeability $\underline{k_{r\phi c}}$ per phase $\underline{\phi}$ per sub-geology c.

14. The non-transitory computer readable medium of claim 13, wherein the laws of reservoir physics comprise formulas:

$$u_{\varphi k c} = -\frac{k}{\mu_{\varphi c}} k_{r\varphi c}(\nabla P_{\varphi c} - \rho_{\varphi c} g),$$

where:
$u_{\phi kc}$ is the velocity of phase $\phi$ at well k, in sub-geology c,
$\mu_{\phi c}$ is the viscosity of phase $\phi$, in sub-geology c,
$\rho_{\phi c}$ is the density of phase $\phi$, in sub-geology c,
$P_{\phi c}$ is the pressure of phase $\phi$, in sub-geology c,
g is the gravity vector,
k is a permeability coefficient, and
$k_{r\phi c}$ is a relative permeability coefficient of phase $\phi$, in sub-geology c.

15. The non-transitory computer readable medium of claim 14, wherein the laws of reservoir physics further comprise heat transfer laws between a fluid or a gas and a rock given by the following formulas:

$$\Phi \partial_t(\rho_w S_w + \rho_g S_g) + \nabla \cdot (\rho_w u_w + \rho_g u_g) = 0$$

$$\Phi \partial_t(\rho_o S_o) + \nabla \cdot (\rho_o u_o) = 0,$$

$$S_o + S_w + S_g = 1,$$

$$\partial_t(E_s + E_f) + \nabla \cdot (U_f - \lambda(T)\nabla T) = 0,$$

where
T=T(x,y,z) is the temperature and can vary over the reservoir,
$\Phi$ is the rock porosity,
$S_\phi$ is the saturation of phase $\phi$,
$\rho_\phi$ is the density of phase $\phi$,
$u_\phi$ is the velocity of phase $\phi$,
E is the volumetric internal energy (indexes s and f corresponding respectively to solid and fluid phases),
$U_f = U_g + U_{o+w}$ is the enthalpy flux, where $U_\phi = \rho_\phi h_\phi u_\phi$,
$h_\phi$ is the specific enthalpy of phase $\phi$,
$h_g = h_w + \Lambda$, $\Lambda$ being the specific heat of water vaporization,
g, w, o indexes being respectively for gas, water and oil,
$\lambda(T)$ is the reservoir conductivity coefficient.

16. The non-transitory computer readable medium of claim 15, wherein the laws of reservoir physics further comprise phase laws given by:
$\mu_{\phi c} = \mu_{\phi c}(P,T)$ the viscosity of phase $\phi$ at sub-geology c, function of the local pressure $\rho$ and the local temperature T;
$\rho_{\phi c} = \rho_{\phi c}(P,T)$ the density of phase $\phi$ at sub-geology c, function of the local pressure P and the local temperature T;
$k_{r\phi c} = k_{r\phi c}(P,T)$ the relative permeability coefficient of phase $\phi$ at sub-geology c, function of the local pressure P and the local temperature T.

17. The non-transitory computer readable medium of claim 1, wherein laws of well physics comprise formulas:

$$Q_{\phi ktc} = T_{kc}(PP_{ktc}, u_{\phi kc})$$

where:
$Q_{\phi ktc}$ is the quantity produced of phase $\phi$ at well k at time t in sub-geology c,
$T_{kc}$ is a transfer function of well k, in sub-geology c,
$PP_{ktc}$ are the production parameters applied to well k in sub-geology c, at time t,
$u_{\phi kc}$ is the velocity of phase $\phi$ at well k in sub-geology c.

18. The non-transitory computer readable medium of claim 1, the method further comprising optimally exploiting a mature hydrocarbon field, comprising the steps of:
iterating several runs of said production simulator in order to find the optimal production parameters optimizing a gain value derived from said quantity produced,
applying said optimal production parameters so obtained to exploit the hydrocarbon field.

19. The non-transitory computer readable medium of claim 18, wherein said optimized gain value is a net present value or reserves of said hydrocarbon field.

20. The non-transitory computer readable medium of claim 19, wherein said net present value $\underline{NPV}$ is determined using the formula:

$$NPV = \sum_i \left(\sum_k \sum_c P_{kc} * R_{ik}\right) * \frac{S_i}{(1+d)^i} - \sum_i \left(\sum_k I_{ik} - \sum_k OC_{ik} - \sum_k \sum_c (TO_i * P_{kc} + TL_i * L_{kc})\right) * \frac{S_i}{(1+d)^i}$$

where:
$P_{kc}$ is oil production (in barrels) for well k and sub-geology c,
$R_{ik}$ is tax and royalties for well k and year I,
$S_i$ is the oil sale price (per barrel) for year I,
d is the percentage discount rate,
$I_{ik}$ investment made on well k during year I,
$OC_{ik}$ is operating costs for well k during year I,
$L_{kc}$ is the liquid production (in barrels) for well k and sub-geology c,
$TO_i$ is treatment cost (per barrel of oil), for year i.
$TL_i$ is treatment cost (per barrel of liquid), for year i.

21. A non-transitory computer readable medium storing a computer program which when executed by a processor of a computer performs a method of producing a production simulator, for simulating a mature hydrocarbon field, providing quantities produced per phase, per well, per layer or group of layers and per time as a function of production parameters, wherein said production simulator is defined by a set of parameters α within a space of solutions, matches history data of said mature hydrocarbon field and exhibits a good forecast reliability, which can be characterized, according to a Statistical Learning Theory, by low forecast expected risk R(α) associated with said parameters α, the method comprising the steps of:
defining initial coarse reservoir partition, rock properties, laws of reservoir physics and laws of well physics,
downscaling said reservoir partition, rock properties, laws of reservoir physics and laws of well physics while keeping a Vapnik condition verified, until the production simulator matches history data and optimizing said production simulator by choosing from among production simulator candidate solutions, a candidate solution minimizing a forecast expected risk $R(\alpha)$.

22. The non-transitory computer readable medium of claim 21, wherein said reservoir partition is downscaled following the steps of:

starting from the whole reservoir, parting said reservoir into sub-geologies $G_c$ where $c \in \{1 \ldots C\}$ where a substantial variation of properties is present at around the boundary between said sub-geologies.

23. The non-transitory computer readable medium of claim 21, wherein rocks properties are downscaled by defining new separate rock properties over each sub-geology $G_c$.

24. The non-transitory computer readable medium of claims 21, wherein laws of reservoir physics are downscaled in such a way they apply with functioning parameters of the sub-geology $G_c$ and wherein space and times scales associated with the sub-geology $G_c$ are determined in such a way that the associated space of solution is consistent with the complexity of history data at the well level.

* * * * *